J. HARRIS, Jr.

Lamp Extinguisher.

No. 11,524.

Patented Aug. 15, 1854.

UNITED STATES PATENT OFFICE.

JOSEPH HARRIS, JR., OF BOSTON, MASSACHUSETTS.

LAMP.

Specification of Letters Patent No. 11,524, dated August 15, 1854.

*To all whom it may concern:*

Be it known that I, JOSEPH HARRIS, Jr., of Boston, in the county of Suffolk and State of Massachusetts, have invented a new and useful Improvement in Lamps; and I do hereby declare that the following is a full and exact description thereof, reference being had to the accompanying drawings and to the letters of reference marked thereon.

The nature of my invention consists in a new mode of producing a center draft in lamps, also a new method of increasing and decreasing the light.

To enable others skilled in the art to make and use my invention I will proceed to describe its construction and operation.

Figure 1:
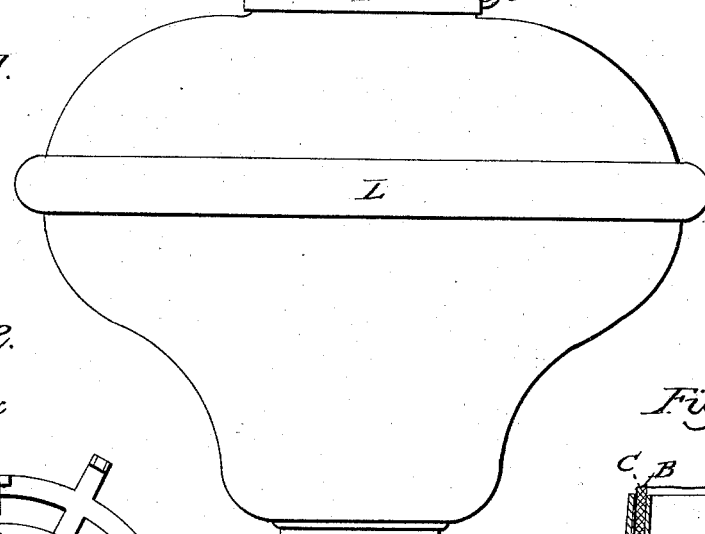
Figure 2:
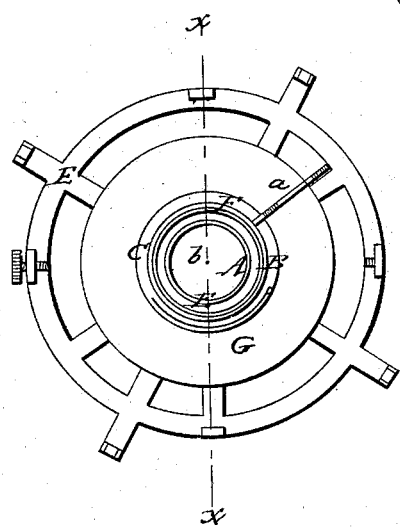
Figure 3:
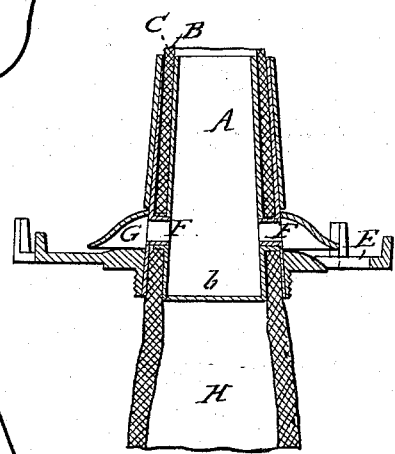

Figure 1 is an elevation of the entire lamp, Fig. 3 is a section on the line X, X, of Fig. 2. Fig. 2 is a plan.

The letter A, on plan Fig. 2, represents a center tube through which the air passes.

The letter B, is a tube which surrounds tube A.

The letter C, is a sliding tube for the purpose of increasing, and decreasing, the light, is operated by an incline plane by means of a slot cut into the same, and having its bearing upon a pin, attached to the tube B. There is also attached to this tube, a wire, marked *a*, extending through, and operated below the frame, or cap E, as can be seen in Fig. 1.

The letters F, F, represents apertures extending through the tubes A and B, for the purpose of giving a center draft, to the lamp, or burner. The letter G is a convex flange placed just above the apertures F, F, for the purpose of assisting the center draft, and also to regulate the external draft. The tube A, is entirely closed below the apertures F, F, as by section *b*.

The letter H, represents the wick which is in two pieces and extend by the apertures F, F and between the tubes A and B, forming a circle at the top of the tubes.

The letter E, represents a cap, or frame, for the purpose of supporting the shade and chimney. The whole arrangement of section Fig. 3, to be screwed into the screw ring K, which is attached to the main body of the lamp as seen in elevation Fig. 1.

The letter L, in elevation represents the main body of the lamp. The letter H, wicks and top of tubes.

The usual mode of getting a center draft to lamps is obtained by extending a tube entirely through it, the tube being connected at the bottom, the air passing through the body of the lamp. The objection to such a mode of applying a center draft is that the tubes have a tendency to heat the fluid causing an evaporation, which is dangerous when using explosive fluid, for which my burner or lamp is particularly adapted. My lamp or burner overcomes these objections not having a tube or any metallic substance to conduct the heat into the body of the lamp.

The burner is attached at much less cost and not so liable to accidents, and also will produce much better light at less expense.

What I claim as new and desire to secure by Letters Patent, is—

The arrangement and construction of the lamp as herein described.

JOSEPH HARRIS, JR.

Witnesses:
T. B. CALDWELL,
WM. H. SIMPSON.